United States Patent
Morita et al.

(10) Patent No.: US 7,503,303 B2
(45) Date of Patent: Mar. 17, 2009

(54) VARIABLE AIR INTAKE CONTROL SYSTEM

(75) Inventors: Haruki Morita, Yokohama (JP);
Kazuyuki Kogiso, Benito Juarez (MX);
Yoshinori Yakabe, Yokohama (JP);
Kazuhiro Fujiwara, Atsugi (JP);
Shigehiro Yamaki, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/869,128

(22) Filed: Oct. 9, 2007

(65) Prior Publication Data
US 2008/0098975 A1    May 1, 2008

(30) Foreign Application Priority Data
Oct. 25, 2006   (JP)   ............................. 2006-290452

(51) Int. Cl.
*F02M 35/10*    (2006.01)
(52) U.S. Cl. .............................. 123/184.53; 123/184.59
(58) Field of Classification Search ............ 123/184.53, 123/184.59
See application file for complete search history.

(56) References Cited

U.S. PATENT DOCUMENTS 5,427,078 A * 6/1995 Hitomi et al. .......... 123/184.53

FOREIGN PATENT DOCUMENTS

JP    H11-148361 A    6/1999

* cited by examiner

*Primary Examiner*—Noah Kamen
(74) *Attorney, Agent, or Firm*—Global IP Counselors, LLP

(57) ABSTRACT

A variable air intake control system includes first and second variable intake control valves, a vacuum tank, actuators, a one-way valve and a controller. The controller selectively is configured to control the first and second actuators to offset operating timings of the first and second variable intake control valves so as to suppress the noise in the one-way valve, when the first and second variable intake control valves are switched from a first operating state in which the first and second variable intake control valves are both in one of the open and closed states to a second operating state in which the first and second variable intake control valves are both in one of the open and closed states that is opposite to the first operating state.

13 Claims, 9 Drawing Sheets

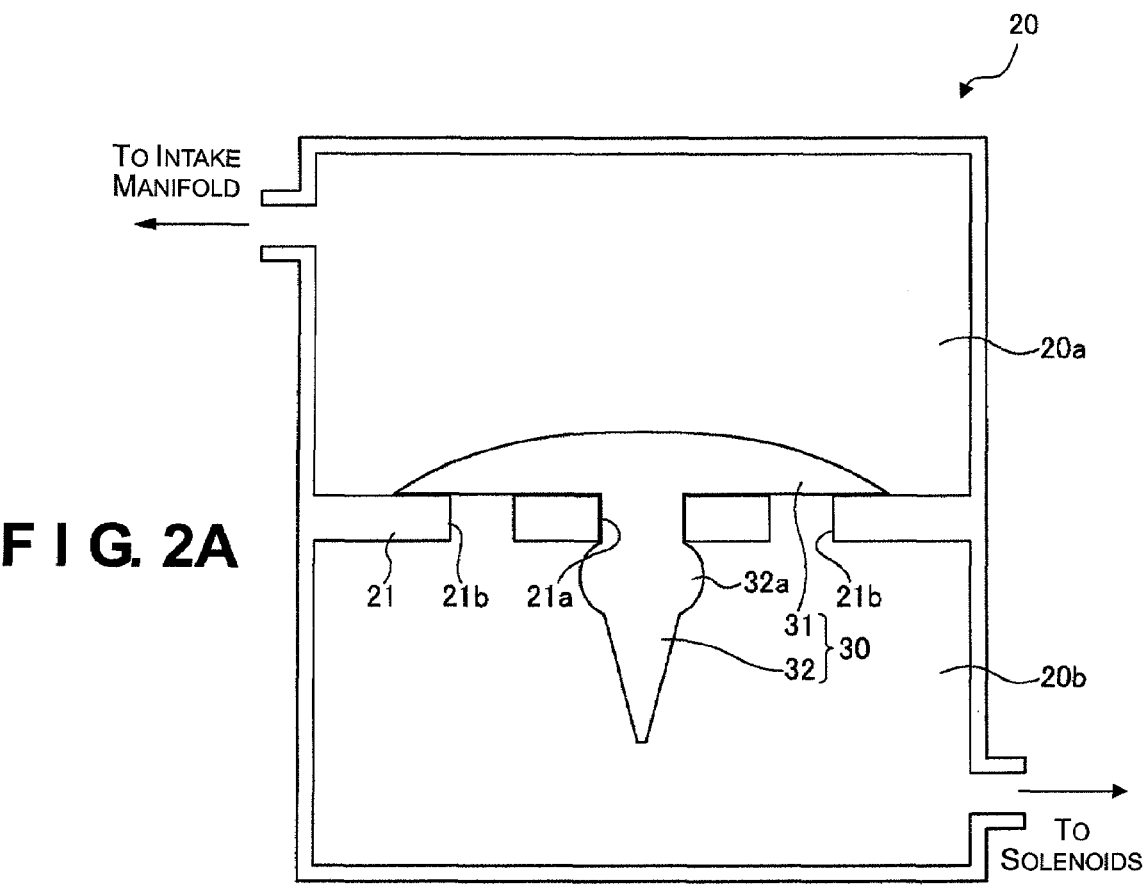
F I G. 2A
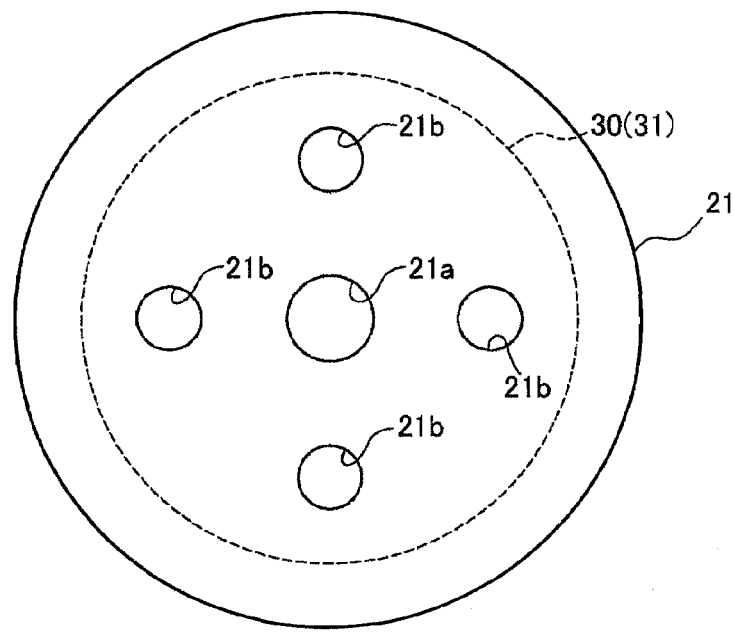
F I G. 2B

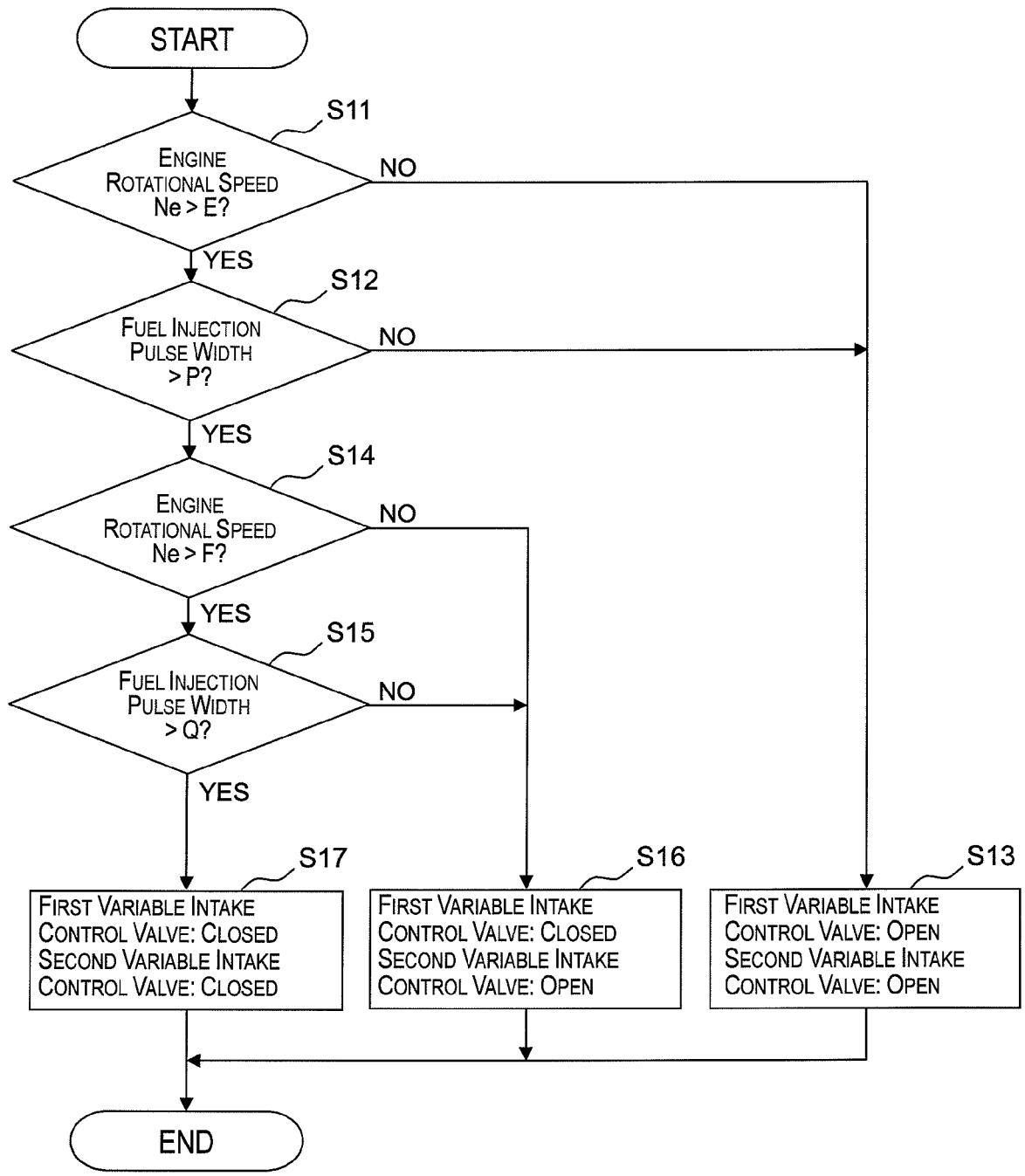
F I G. 6

VARIABLE AIR INTAKE CONTROL SYSTEM

CROSS-REFERENCE TO RELATED APPLICATIONS

This application claims priority to Japanese Patent Application No. 2006-290452, filed on Oct. 25, 2006. The entire disclosure of Japanese Patent Application No. 2006-290452 is hereby incorporated herein by reference.

BACKGROUND OF THE INVENTION

1. Field of the Invention

The present invention relates to a control system for controlling the operation of variable intake control valves of an engine.

2. Background Information

Japanese Laid-Open Patent Publication No. 11-148361 discloses an engine having a plurality of variable intake control valves provided between first and second intake passage portions in an air intake system. The variable intake control valves are selectively opened and closed in accordance with the rotational speed of the engine (engine rotational speed) such that resonance supercharging is performed using a pulsation effect of the intake air when the engine is operating in a low speed region, and inertia supercharging is performed using air column inertia of the intake air when the engine is operating in a high speed region.

In view of the above, it will be apparent to those skilled in the art from this disclosure that there exists a need for an improved variable air intake control system. This invention addresses this need in the art as well as other needs, which will become apparent to those skilled in the art from this disclosure.

SUMMARY OF THE INVENTION

The variable intake control valves can be driven by using the negative pressure of the engine accumulated in a vacuum tank, which is coupled to the intake manifold via a one-way valve. However, it has been discovered that a noise is emitted from the one-way valve when the variable intake control valves are driven.

The present invention was conceived in view of this noise problem. One object of the present invention is to provide a variable air intake control system that can suppress the noise emitted from the one-way valve.

In order to achieve the above object of the present invention, a variable air intake control system includes an intake passage, first and second variable intake control valves, a vacuum tank, first and second actuators, a one-way valve and a controller. The intake passage has a first air intake passage portion and a second air intake passage portion to supply air to an engine. The first and second variable intake control valves are arranged between the first and second intake passage portions to selectively open and close communication between the first and second intake passage portions. The vacuum tank is configured and arranged to store negative pressure. The first and second actuators are operatively coupled between the vacuum tank and the first and second variable intake control valves, respectively, to independently drive each of the first and second variable intake control valves between an open state and a closed state using the negative pressure in the vacuum tank. The one-way valve is arranged between the vacuum tank and the intake passage to selectively establish communication between the vacuum tank and the intake passage. The controller is configured to control the first and second actuators to offset operating timings of the first and second variable intake control valves so as to suppress the noise in the one-way valve, when the first and second variable intake control valves are switched from a first operating state in which the first and second variable intake control valves are both in one of the open and closed states to a second operating state in which the first and second variable intake control valves are both in one of the open and closed states that is opposite to the first operating state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2A is a schematic cross sectional view of a vacuum tank of the variable air intake control system in accordance with the first embodiment of the present invention;

FIG. 2B is a bottom plan view of a partition wall of the vacuum tank in accordance with the first embodiment of the present invention;

FIG. 6 is a flowchart showing a control logic executed by a controller of the variable air intake control system in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
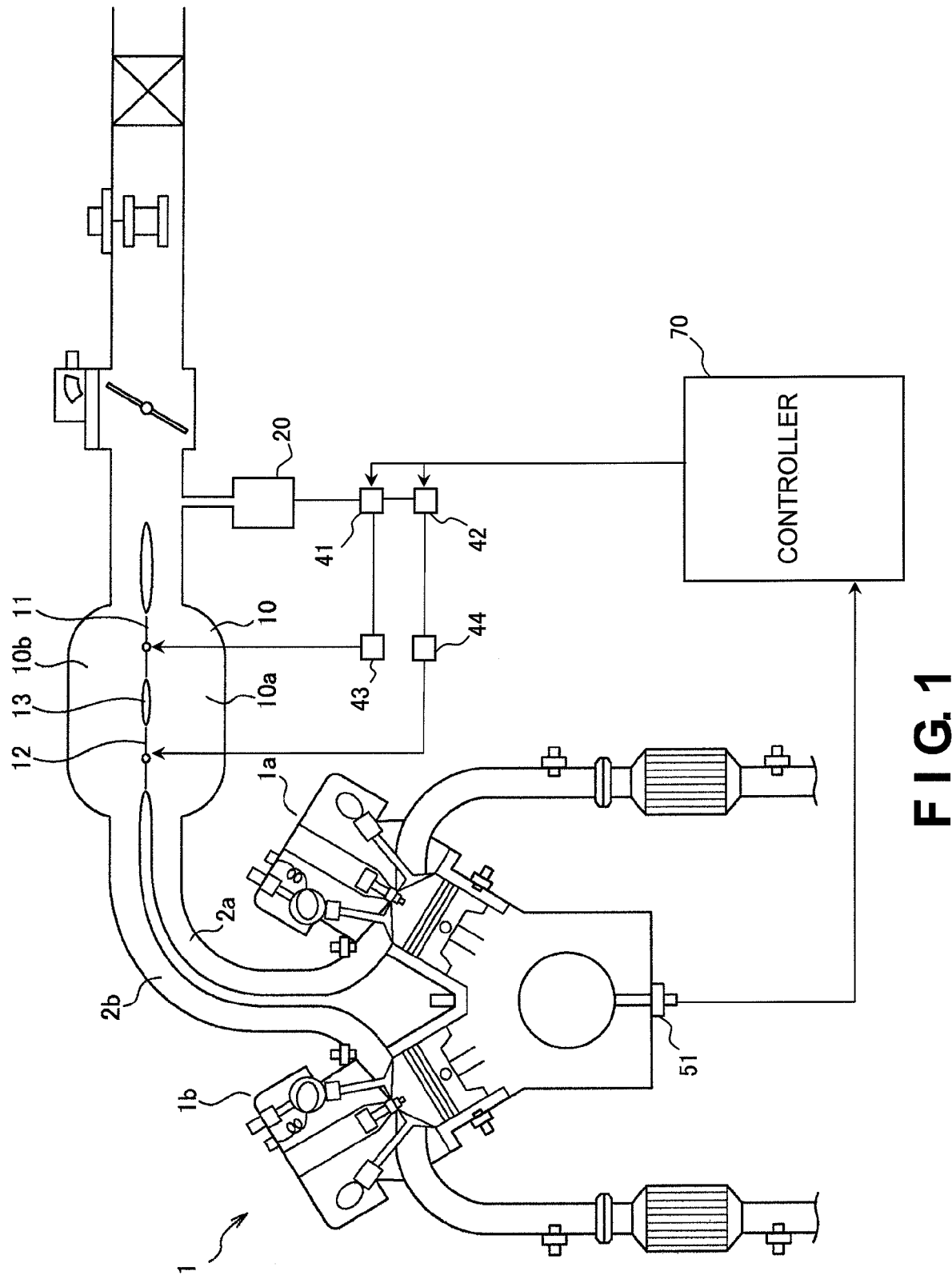
FIG. 1 is a simplified overall schematic view of an engine provided with a variable air intake control system in accordance with a first embodiment of the present invention.

FIG. 1 is a simplified overall schematic view of an engine 1 provided with a variable air intake control system in accordance with a first embodiment of the present invention.

The engine 1 is, for example, a V-type engine having six cylinders divided into a right cylinder bank (group) 1a and a left cylinder bank (group) 1b. The right and left cylinder banks 1a and 1b are fluidly coupled to an intake manifold 10 that forms a part of an air intake passage. More specifically, the internal area of the intake manifold 10 is divided into a first volume chamber 10a and a second volume chamber 10b by a partitioning wall 13 as shown in FIG. 1. The first volume chamber 10a communicates with a first air intake passage portion (intake runner) 2a of the intake passage, which is connected to the right cylinder bank 1a of the engine 1. The second volume chamber 10b communicates with a second air intake passage portion (intake runner) 2b of the intake passage, which is connected to the left cylinder bank 1b of the engine 1.

As shown in FIG. 1, the intake manifold 10 includes a first variable intake control valve 11 and a second variable intake control valve 12 that are provided on the partitioning wall 13 inside the intake manifold 10. In the first embodiment of the present invention, the first and second variable intake control valves 11 and 12 are open by default (initially open) so that the first volume chamber 10a and the second volume chamber 10b communicate with each other. When the engine 1 is started and begins to rotate, both of the first and second variable intake control valves 11 and 12 are closed as shown in FIG. 1. As the engine rotational speed increases, the first variable intake control valve 11 is opened and, subsequently, the second variable intake control valve 12 is opened so that both of the first and second variable intake control valves 11 and 12 are open. By operating the first and second variable intake control valves 11 and 12 in this way, resonance supercharging is conducted using a pulsation effect of the intake air when the engine 1 is operating in a low speed region and inertia supercharging is conducted using air column inertia of the intake air when the engine 1 is operating in a high speed region. Thus, the first and second variable intake control valves 11 and 12 are used as tumble control valves.

The engine 1 is further provided with a vacuum tank 20 that is connected to the intake passage near the intake manifold 10. More specifically, the vacuum tank 20 is arranged to communicate with the intake manifold 10 at a position that is adjacent to the first variable intake control valve 11 and distant from the second variable intake control valve 12.

The vacuum tank 20 is operatively coupled to a pair of first and second solenoids 41 and 42. The first and second solenoids 41 and 42 are configured and arranged to control operations of the first and second variable intake control valves 11 and 12, respectively, through first and second variable intake control valve actuators 43 and 44 (e.g., vacuum actuators), respectively, using the negative pressure accumulated in the vacuum tank 20.

A controller 70 is provided to control operations of the first and second solenoids 41 and 42 based on the operating conditions of the engine 1. The control operation of the first and second variable intake control valves 11 and 12 will be explain in more detail below with reference to FIG. 3.

FIG. 2A is a schematic vertical cross sectional view of the vacuum tank 20, and FIG. 2B is a bottom plan view of an internal structure of the vacuum tank 20.

As shown in FIG. 2A, the internal space of the vacuum tank 20 is divided by a partitioning wall 21 into an intake manifold communication chamber 20a that communicates with the intake manifold 10 and a negative pressure holding chamber 20b that holds negative pressure. Moreover, a one-way valve 30 is coupled to the partitioning wall 21 of the vacuum tank 20 as shown in FIG. 2A.

The partitioning wall 21 has a one-way valve insertion hole 21a and four air passage holes 21b formed therein. More specifically, the air passage holes 21b are arranged and centered around the one-way valve insertion hole 21a as shown in FIG. 2B.

The one-way valve 30 is preferably made of a silicon resin material. The one-way valve 30 includes an umbrella-shaped portion 31 and a leg portion 32. The umbrella-shaped portion 31 is arranged to control the amount of air flowing through the air passage holes 21b. The leg portion 32 is inserted through the one-way valve insertion hole 21a formed in the partitioning wall 21 to fasten the one-way valve 30 to the partitioning wall 21. More specifically, the leg portion 32 includes a protrusion 32a that passes through the partitioning wall 21 and fastens the one-way valve 30 to the partitioning wall 21 as shown in FIG. 2A. The distal end of the leg portion 32 preferably has a pointed shape.

The umbrella-shaped portion 31 of the one-way valve 30 has the shape of a circular disk that is very thin around the perimeter and raised (thicker) in the middle as shown in FIG. 2A. When the one-way valve 30 is installed in the partitioning wall 21 of the vacuum tank 20, the umbrella-shaped portion 31 rests over the air passage holes 21b. When a negative pressure develops in the intake manifold communication chamber 20a and the pressure difference with respect to the negative pressure holding chamber 20b becomes large, the umbrella-shaped portion 31 folds back (rolls back) toward the intake manifold communication chamber 20a (upward in FIG. 2A) and air flows from the negative pressure holding chamber 20b to the intake manifold communication chamber 20a through the air passage holes 21b. When the negative pressure acting on the intake manifold communication chamber 20a is small, the umbrella-shaped portion 31 blocks the air passage holes 21b and prevents air from flowing between the intake manifold communication chamber 20a and the negative pressure holding chamber 20b. As a result of this structure, the negative pressure holding chamber 20b is arranged to hold negative pressure and to prevent the negative pressure from flowing into the intake passage from the negative pressure holding chamber 20b.

Figure 3:
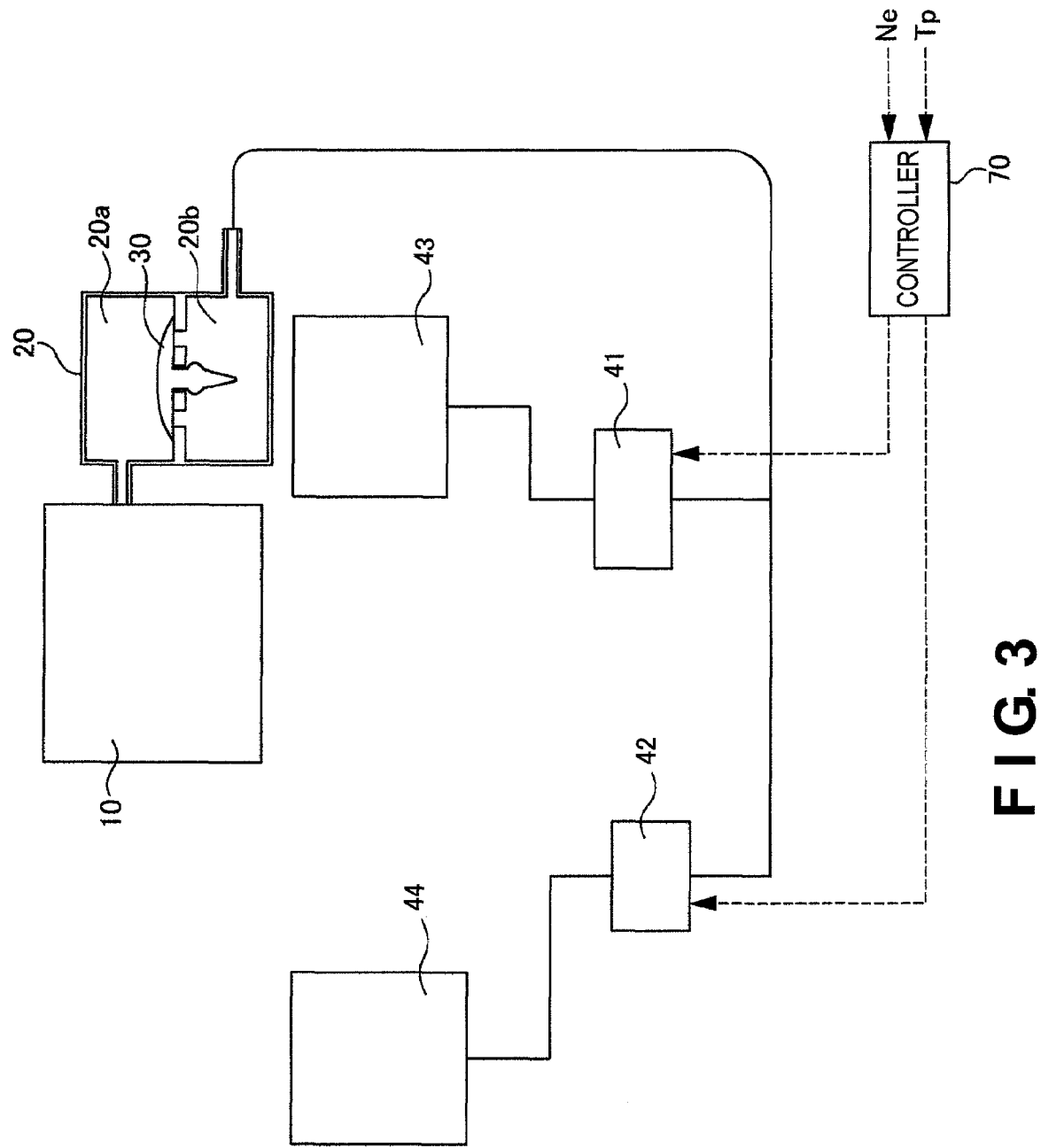
FIG. 3 is a system block diagram of the variable air intake control system for explaining how the operation of the variable intake control valves is controlled in accordance with the first embodiment of the present invention.

FIG. 3 is a system block diagram for explaining how the operation of the first and second variable intake control valves 11 and 12 is controlled.

As shown in FIG. 3, the intake manifold communication chamber 20a of the vacuum tank 20 communicates with the intake manifold 10 while the negative pressure holding chamber 20b of the vacuum tank 20 communicates with the first and second variable intake control valve actuators 43 and 44 through the first and second solenoids 41 and 42, respectively. When the first solenoid 41 and the second solenoid 42 are driven, the negative pressure of the negative pressure holding chamber 20b is directed to the first and second variable intake control valve actuators 43 and 44, respectively, and the opening degrees of the variable intake control valves 11 and 12, respectively, are adjusted. The driving of the first solenoid 41 and the second solenoid 42 is controlled by the controller 70.

The controller 70 preferably includes a microcomputer comprising a central processing unit (CPU) with a variable intake control valve control program that controls the first and second variable intake control valves 11 and 12 as discussed below. The controller 70 can also include other conventional components such as an input interface circuit, an output interface circuit, and storage devices such as a ROM (Read Only Memory) device and a RAM (Random Access Memory)

device. The microcomputer of the controller 70 is programmed to control at least the operations of the first and second solenoids 41 and 42 as discussed below. The memory circuit stores processing results and control programs that are run by the processor circuit. The controller 70 is operatively coupled to the various components of the engine 1 in a conventional manner. The internal RAM of the controller 70 stores statuses of operational flags and various control data. The internal ROM of the controller 70 stores the preset maps and data for various operations. The controller 70 is capable of selectively controlling any of the components of the control system in accordance with the control program. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. It is also acceptable for the controller 70 to be made up of a plurality of microcomputers.

The controller 70 is further configured to detect a rotational speed Ne of the engine 1 based on, for example, a detection signal from a engine speed sensor 51 (FIG. 1), and to determine a fuel injection pulse width Tp of the fuel supplied to the engine 1 based on the engine operating condition.

As mentioned above, in the first embodiment of the variable air intake control system, the first and second variable intake control valves 11 and 12 are placed in an open state by default due to a spring force. When the engine 1 is started or is otherwise in a low rotational speed region, the first and second variable intake control valves 11 and 12 are driven to close. Then, as the engine rotational speed increases, the first variable intake control valve 11 is opened and, subsequently, the second variable intake control valve 12 is opened such that both of the first and second variable intake control valves 11 and 12 are open.

Figure 9:
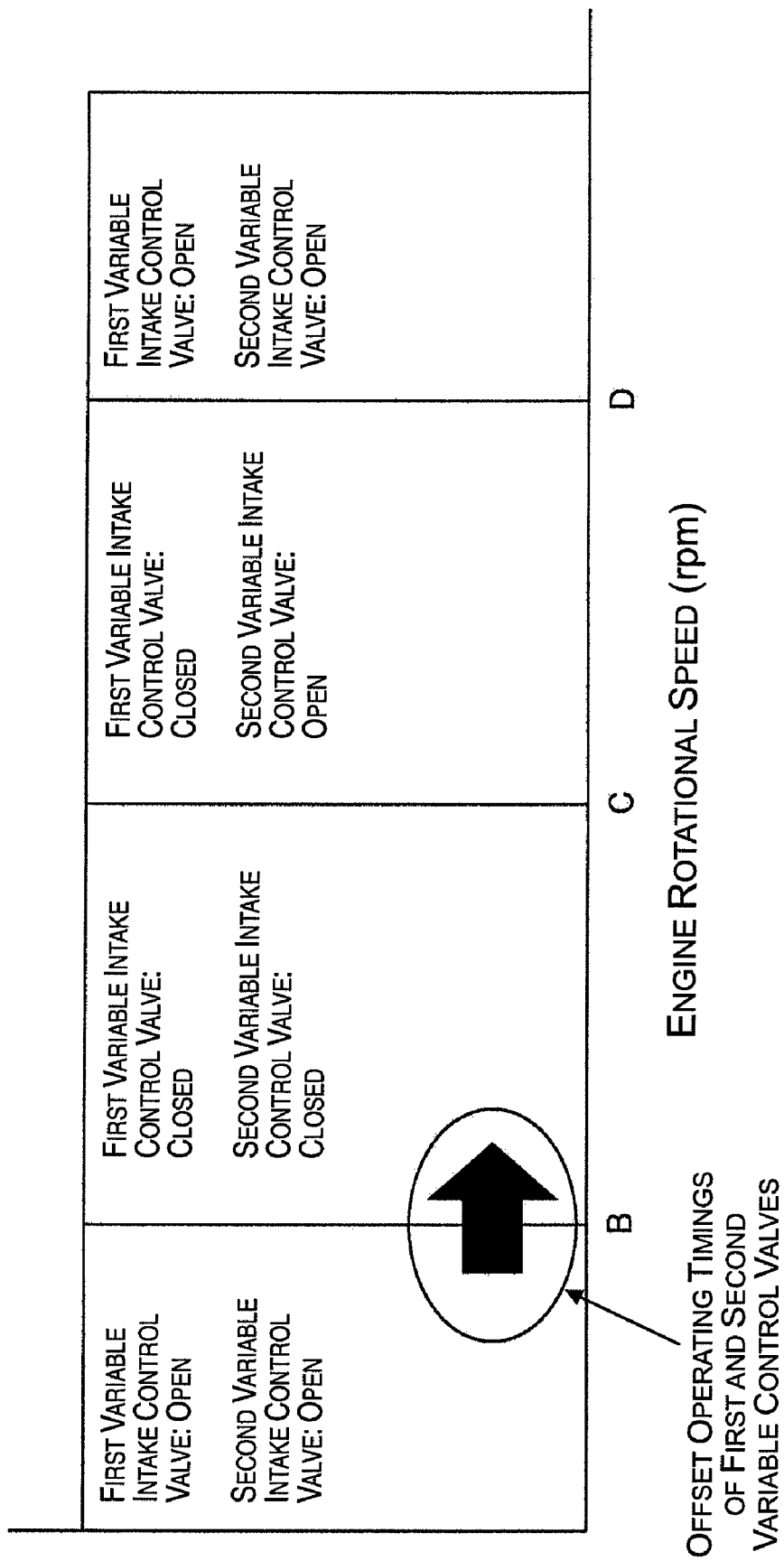
FIG. 9 is one example of a schematic chart illustrating operating timings of the variable intake control valves with respect to the engine rotational speed in accordance with the illustrated embodiments of the present invention.

More specifically, FIG. 9 illustrates one example of operating timings of the first and second variable intake control valves 11 and 12 with respect to the engine rotational speed. As shown in FIG. 9, both of the first and second variable intake control valves 11 and 12 are open when the engine rotational speed is very low, and maintained in the open state until the engine rotational speed reaches a prescribed rotational speed B (e.g., approximately 1800 rpm). When the engine rotational speed surpasses the prescribed rotational speed B, both of the first and second variable intake control valves 11 and 12 are closed with an offset period being provided between the close timings of the first and second variable intake control valves 11 and 12. Then, the first variable intake control valve 11 is opened when the engine rotational speed surpasses a prescribed rotational speed C (e.g. approximately 4000 rpm) and the second variable intake control valve 12 is opened such that both variable intake control valves are open when the engine rotational speed surpasses a prescribed rotational speed D (e.g., approximately 4800 rpm).

The opening and closing of the first and second variable intake control valves 11 and 12 are controlled in accordance with the rotational speed of the engine 1 (engine rotational speed) such that resonance supercharging is conducted using a pulsation effect of the intake air when the engine 1 is operating in a low speed region and inertia supercharging is conducted using air column inertia of the intake air when the engine 1 is operating in a high speed region.

However, if the first and second variable intake control valves 11 and 12 were closed simultaneously from the open state when the engine rotational speed surpasses the prescribed rotational speed B, the negative pressure of the negative pressure holding chamber 20b of the vacuum tank 20 would be consumed abruptly with the pressure difference being developed between the intake manifold communication chamber 20a and the negative pressure holding chamber 20b. In such case, the umbrella-shaped portion 31 of the one-way valve 30 would roll back, and the air would flows from the negative pressure holding chamber 20b to the intake manifold communication chamber 20a through the air passage holes 21b. This flowing air would generate a noise (hissing sound).

Accordingly, in the first embodiment of the present invention, the operation of the first and second variable intake control valves 11 and 12 is controlled so that a time difference (offset period) is provided between the close timings of the first and second variable intake control valves 11 and 12 when both of the first and second variable intake control valves 11 and 12 are closed from the open state. As a result, the abrupt consumption of the negative pressure in the negative pressure holding chamber 20b of the vacuum tank 20 is prevented and the air flow noise (hissing sound) is eliminated.

However, if this time difference is too large, the driver will feel a step-like change in the engine torque and the drivability of the vehicle will be degraded. Therefore, in the first embodiment of the present invention, the time difference between the close timings of the first and second variable intake control valves 11 and 12 is changed as appropriate based on the engine load (e.g., the fuel injection pulse width) and the engine rotational speed. In this way, control can be executed such that the air flow noise (hissing sound) is prevented and the driver does not feel a step-like change in the engine torque.

The control of the variable intake control valves 11 and 12 will now be explained in more detail.

Figure 4:
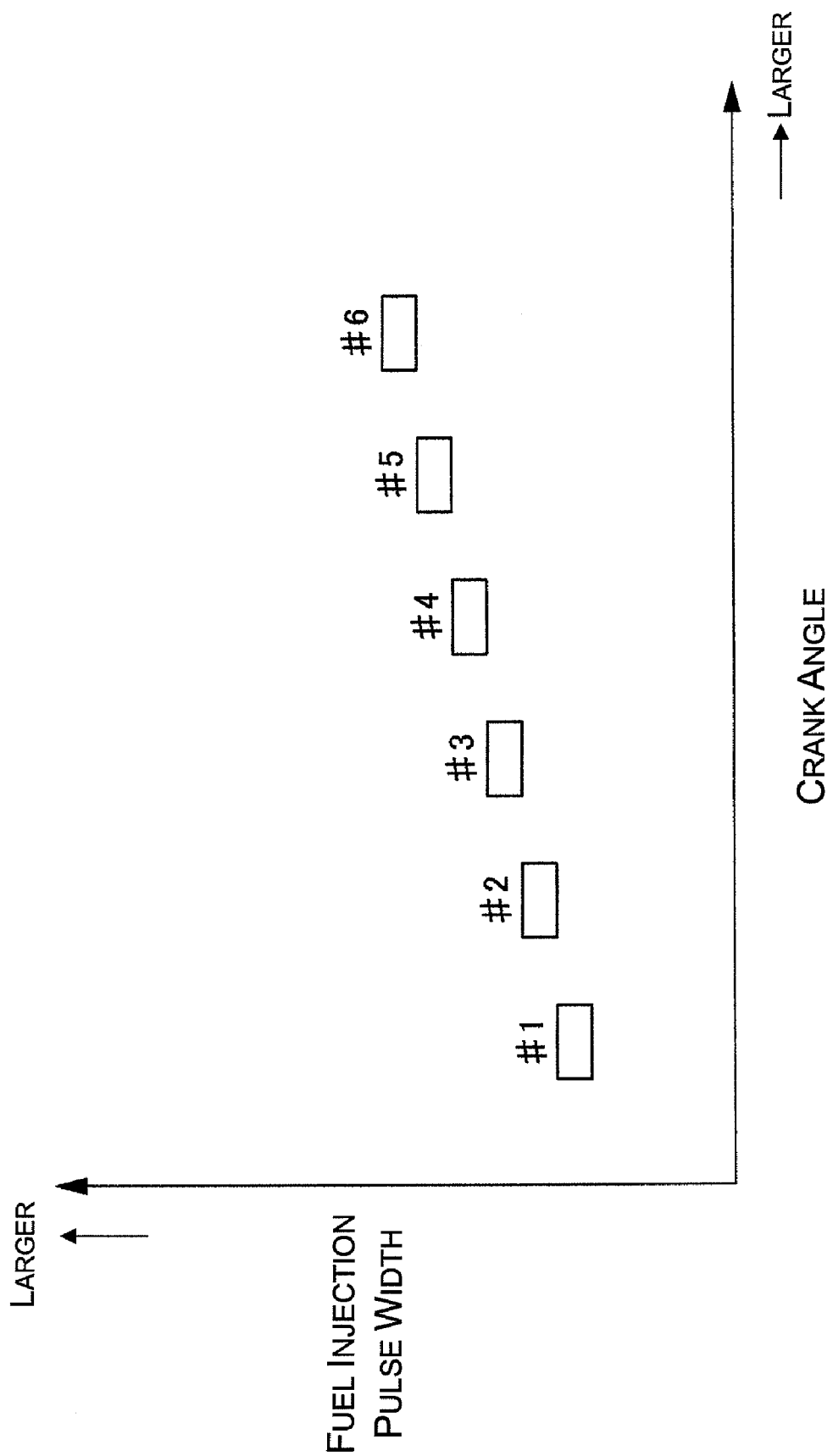
FIG. 4 is a schematic diagram illustrating an example of fuel injection timings and fuel injection pulse widths during acceleration of a vehicle having a six-cylinder engine.

FIG. 4 shows an example of the fuel injection timing and the fuel injection pulse width during acceleration of the vehicle equipped with the six-cylinder engine 1.

In the first embodiment of the present invention, the firing order of the cylinders is set to, for example, #1→#2→#3→#4→#5→#6 in the V-type engine 1 having six cylinders (cylinders #1 to #6). During acceleration of the vehicle, the fuel injection quantity delivered to each cylinder increases, and thus, the fuel injection pulse increases as shown in FIG. 4.

Figure 5:
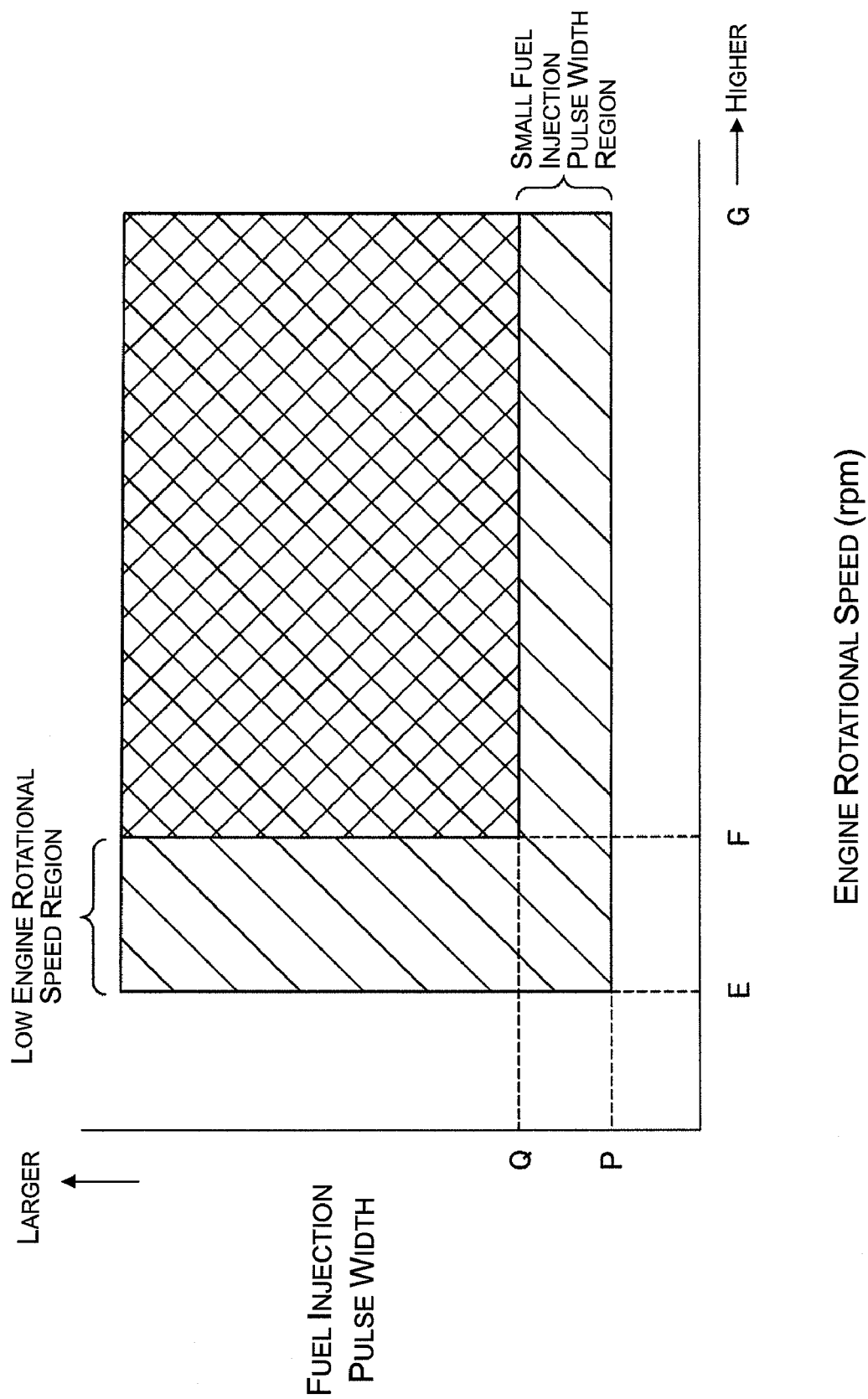
FIG. 5 is a schematic diagram showing an example of a control characteristic map used by the variable air intake control system in accordance with the first embodiment of the present invention.

Accordingly, in the first embodiment of the present invention, the time difference between the close timings of the first and second variable intake control valves 11 and 12 is set based on the fuel injection pulse width. More specifically, the opening and closing of the first and second variable intake control valves 11 and 12 is controlled based on the characteristic map such as one shown in FIG. 5. In the characteristic map shown in FIG. 5, a low engine rotation speed region is set to be a region with an engine rotational speed that is higher than a first reference rotational speed E (e.g., approximately 1400 rpm) and lower than a second reference rotational speed F (e.g., approximately 1800 rpm). Moreover, a small fuel injection pulse region is set to be a region with a fuel injection pulse width that is larger than a first reference pulse width P (e.g., approximately 5 ms) and smaller than a second reference pulse width Q (e.g., approximately 10 ms). The first and second reference rotational speeds E and F and the first and second reference pulse widths P and Q in FIG. 5 are preferably determined based on the specification of the engine 1 and the like so that the driver does not feel a step-like change in the engine torque. The characteristic map shown in FIG. 5 is preferably set in advance and stored in the ROM of the controller 70.

In the first embodiment of the present invention, when the engine 1 is operating in the low engine rotational speed region or the small fuel injection pulse width region as shown in FIG. 5, the first variable intake control valve 11 is closed while the second variable intake control valve 12 is still opened so that the first and second variable intake control valves 11 and 12 are prevented from being simultaneously closed.

Referring now to the flowchart of FIG. 6, the control logic executed by the controller 70 to control the operations of the first and second variable intake control valves 11 and 12 will now be explained. The controller 70 is configured to repeatedly execute the control processing shown in the flowchart of FIG. 6 once per prescribed cycle time (e.g., once every 10 milliseconds).

In step S11, the controller 70 is configured to determine if the engine rotational speed Ne has exceeded the first reference rotational speed E. If the engine rotational speed Ne has exceeded the first reference rotational speed E, then the controller 70 proceeds to step S12. Otherwise, the controller 70 proceeds to step S13.

In step S12, the controller 70 is configured to determine if the fuel injection pulse width has exceeded the first reference pulse width P. If the fuel injection pulse width has exceeded the first reference pulse width P, then the controller 70 proceeds to step S14. Otherwise, the controller 70 proceeds to step S13.

In step S13 the controller 70 is configured to open both of the first and second variable intake control valves 11 and 12.

In step S14, the controller 70 is configured to determine if the engine rotational speed Ne has exceeded the second reference rotational speed F. If the engine rotational speed has exceeded the second reference rotational speed F, then the controller 70 proceeds to step S15. Otherwise, the controller 70 proceeds to step S16.

In step S15, the controller 70 is configured to determine if the fuel injection pulse width has exceeded the second reference pulse width Q. If the fuel injection pulse width has exceeded the second reference pulse width Q, then the controller 70 proceeds to step S17. Otherwise, the controller 70 proceeds to step S16.

In step S16 the controller 70 is configured to close the first variable intake control valve 11 and to leave the second variable intake control valve 12 open.

In step S17, the controller 70 is configured to close the second variable intake control valve 12 in addition to the first variable intake control valve 11 so that both of the first and second variable intake control valves 11 and 12 are closed.

The operation of the variable air intake control system in accordance with the flowchart shown in FIG. 6 will now be explained.

Until the engine rotational speed Ne reaches the first reference rotational speed E, the control sequence of steps S11→S13 is executed repeatedly and both of the first and second variable intake control valves 11 and 12 are maintained in the open state.

If the engine rotational speed Ne reaches the first reference rotational speed E but the fuel injection pulse width does not surpass the first reference pulse width P, then the controller 70 is configured to execute the control sequence of steps S11→S12→S13 such that both of the first and second variable intake control valves 11 and 12 are maintained in the open state.

After the engine rotational speed Ne reaches the first reference rotational speed E and the fuel injection pulse width exceeds the first reference pulse width P, the controller 70 is configured to repeat the control sequence of steps S11→S12→S14→ S16 until the engine rotational speed Ne reaches the second reference rotational speed F. During this control sequence, the first variable intake control valve 11 is closed while the second variable intake control valve 12 is maintained in the open state.

After the engine rotational speed Ne has exceeded the first reference rotational speed E, the fuel injection pulse width has exceeded the first reference pulse width P, and the engine rotational speed has reached the second reference rotational speed F, the controller 70 is configured to repeat the control sequence of steps S11→S12→S14→ S15→S16 if the fuel injection pulse width has not exceeded the second reference pulse width Q. During this control sequence, the first variable intake control valve 11 remains closed and the second variable intake control valve 12 remains open.

If the engine rotational speed Ne has reached the second reference rotational speed F and the fuel injection pulse width has exceeded the second reference pulse width Q, then the controller 70 is configured to execute the control sequence of steps S11→S12 →S14→S15→S17 to close the second variable intake control valve 12 such that both of the first and second variable intake control valves 11 and 12 are closed.

Thus, during a transition from a state in which both of the first and second variable intake control valves 11 and 12 are open (step S13) to a state in which both of the first and second variable intake control valves 11 and 12 are closed (step S17), there is a temporary (transitional) period during which only the first variable intake control valve 11 is closed (step S16).

As a result, abrupt consumption of the negative pressure in the negative pressure holding chamber 20*b* of the vacuum tank 20 can be prevented and the occurrence of air flow noise (a hissing sound) can be suppressed.

Moreover, in the first embodiment of the present invention, the first variable intake control valve 11, which is disposed closer to a communicating portion between the intake manifold 10 and the vacuum tank 20, is first closed while the second variable intake control valve 12 is maintained open during the transitional period. If the second variable intake control valve 12, which is disposed farther away from the communicating portion, were closed first and the first variable intake control valve 11 were closed afterwards, then the negative pressure developments resulting from the closing of each of the first and second variable intake control valves 11 and 12 could possibly affect the one-way valve 30 at substantially the same time. Therefore, in the first embodiment, the first variable intake control valve 11 that is disposed closer to the communicating portion between the intake manifold 10 and the vacuum tank 20 is closed first and the second variable intake control valve 12 that is disposed farther away from the communicating portion is closed afterwards. As a result, the negative pressure developments resulting from the closing of each of the first and second variable intake control valves 11 and 12 can be reliably prevented from affecting the one-way valve 30 simultaneously.

Additionally, the first embodiment is configured to control the open/close timing of the first and second variable intake control valves 11 and 12 based on the load (e.g., the fuel injection pulse width in the first embodiment) as well as the engine rotational speed. Since the air flow sound (hissing sound) emitted from the vacuum tank 20 changes depending on the negative pressure of the intake manifold 10, the first and second variable intake control valves 11 and 12 can be opened and closed at appropriate timings that are neither too late nor too early by controlling the first and second variable intake control valves 11 and 12 based on both the engine rotational speed Ne and the engine load (e.g., the fuel injection pulse width in the first embodiment).

Second Embodiment

Figure 7:
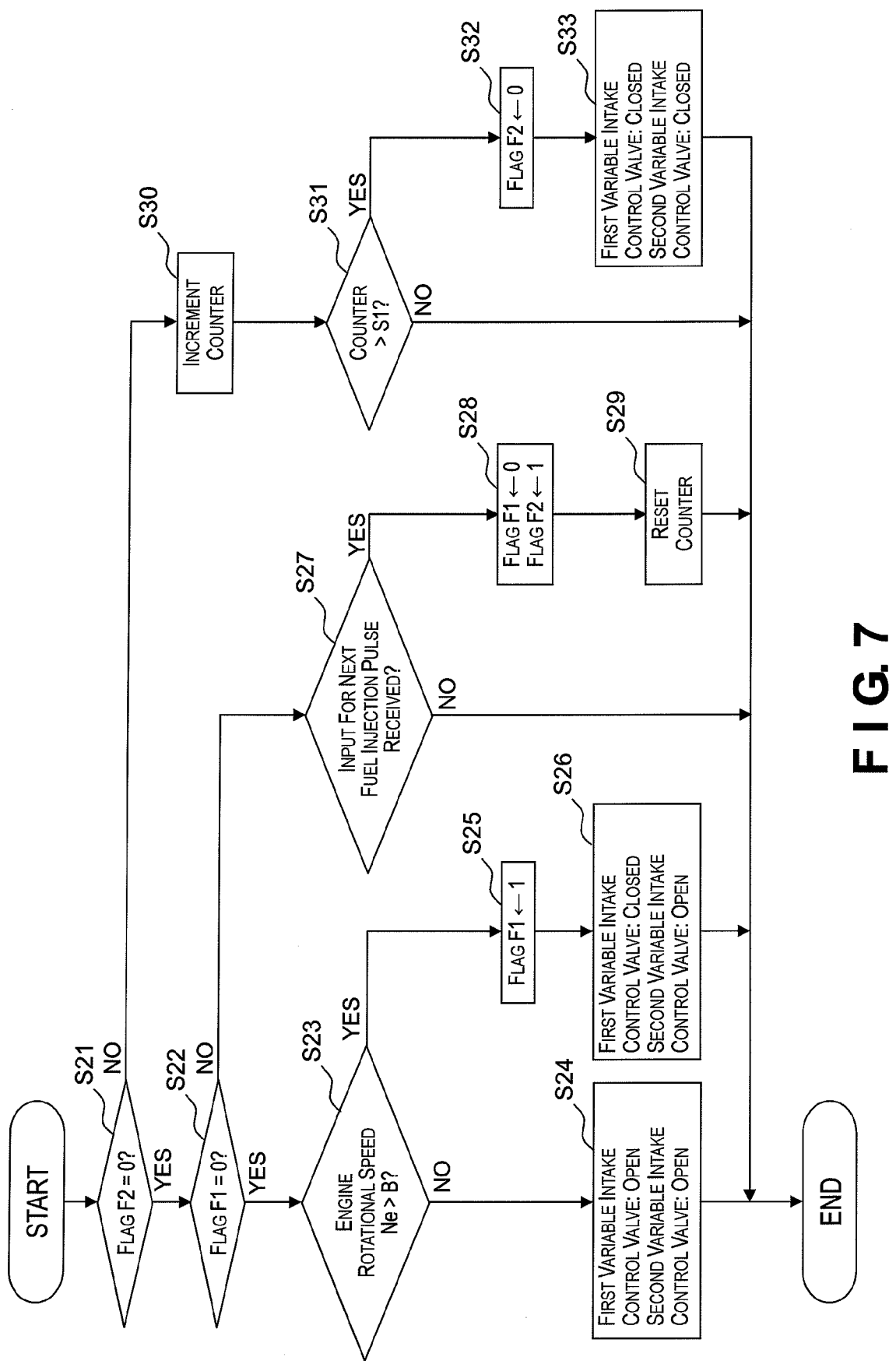
FIG. 7 is a flowchart showing a control logic executed by a controller of the variable air intake control system in accordance with a second embodiment of the present invention.
Figure 8:
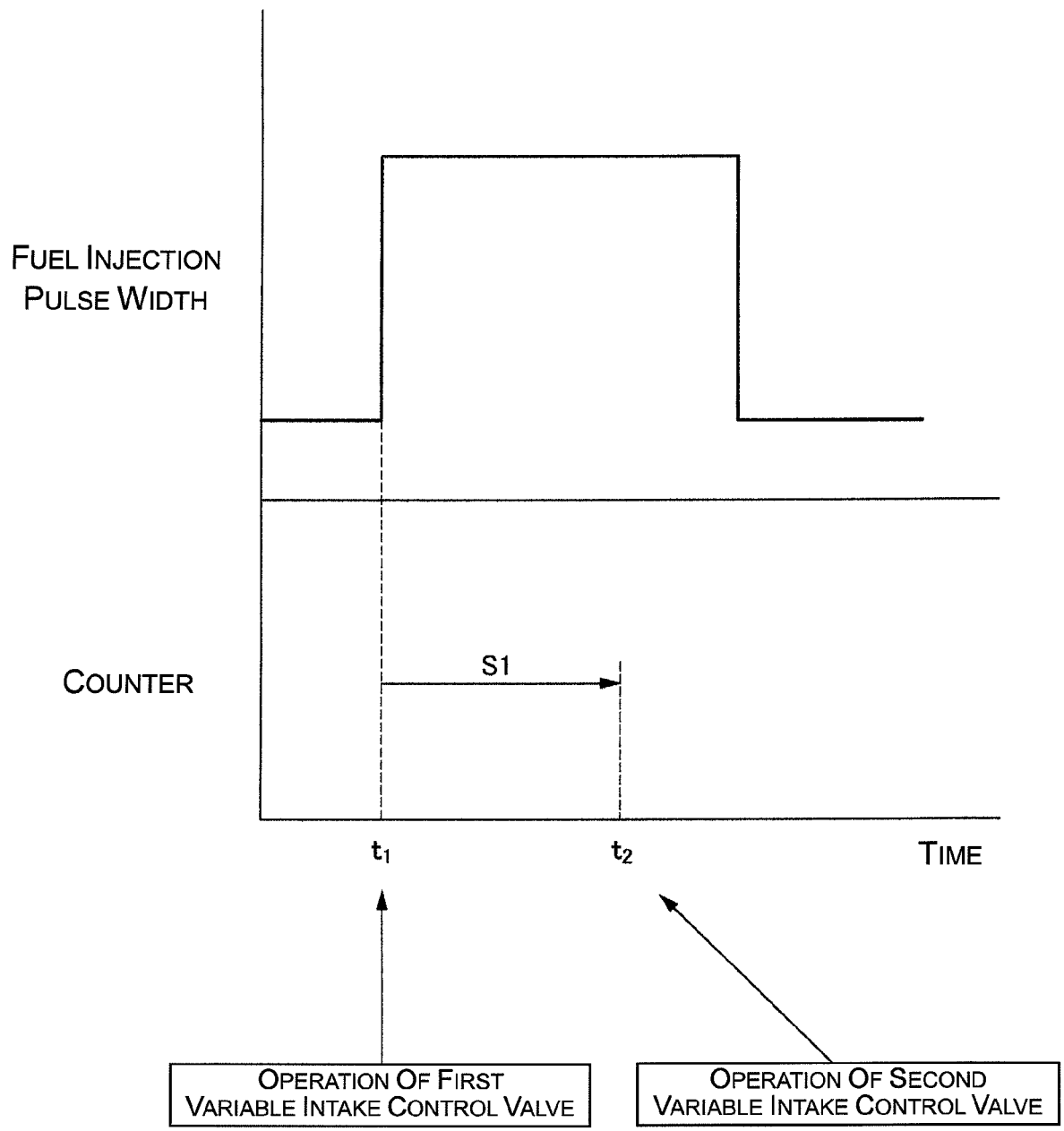
FIG. 8 is a timing chart illustrating the operating timings of the variable intake control valves with respect to the fuel injection pulse width and the value of the counter when the flowchart shown in FIG. 7 is executed in accordance with the second embodiment of the present invention.

Referring now to FIGS. 7 and 8, a variable air intake control system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The variable air intake control system of the second embodiment only differs from the variable air intake control system of the first embodiment in the control process executed by the controller 70.

More specifically, in the second embodiment of the present invention, the controller 70 is configured to execute the control in the flowchart of FIG. 7 when the opening/closing state of the first and second variable intake control valves 11 and 12 is changed from a state in which both of the first and second variable intake control valves 11 and 12 are opened to a state in which both of the first and second variable intake control valves 11 and 12 are closed according to the increase in the rotational speed of the engine 1. Referring now to the flowchart of FIG. 7, the control processing executed by the controller 70 of the variable air intake control system in accordance with the second embodiment will be explained.

In step S21, the controller 70 is configured to determine if the value of a pulse input flag F2 is zero. The value of the pulse input flag F2 indicates whether the input for the next fuel injection pulse has been received or not. More specifically, when the value of the pulse input flag F2 is zero, the controller 70 determines that the next fuel injection pulse has not been received. The default value of the pulse input flag F2 is zero. If the value of the pulse input flag F2 is zero in step S21, then the controller 70 proceeds to step S22. Otherwise, the controller 70 proceeds to step S30.

In step S22, the controller 70 is configured to determine if the value of a high engine speed flag F1 is zero. The value of the high engine speed flag F1 indicates whether or not the engine rotational speed exceeded the prescribed rotational speed B (e.g., the prescribed rotational speed B as shown in FIG. 9). More specifically, when the value of the high engine speed flag F1 is zero, the controller 70 determines that the engine rotational speed has not reached the prescribed rotational speed B. If the value of the high engine speed flag F1 is zero in step S22, then the controller 70 proceeds to step S23. Otherwise, the controller proceeds to step S27.

In step S23, the controller 70 is configured to determine if the engine rotational speed Ne has exceeded the prescribed rotational speed B. If the engine rotational speed Ne has exceeded the prescribed rotational speed B, then the controller 70 proceeds to step S24. Otherwise, the controller 70 proceeds to step S25.

In step S24, the controller 70 is configured to open both of the first and second variable intake control valves 11 and 12.

In step S25, since the engine rotational speed has exceeded the prescribed rotational speed B in step S23, the controller 70 is configured to set the value of the high engine speed flag F1 to 1.

In step S26, the controller 70 is configured to close the first variable intake control valve 11 and to leave the second variable intake control valve 12 open.

In step S27, the controller 70 is configured to determine if an input for the next fuel injection pulse has been received. If the input for the next fuel injection pulse has not been received, then the controller 70 ends the routine and returns. If the input for the next fuel injection pulse has been received, then the controller 70 proceeds to step S28.

In step S28, the controller 70 is configured to reset the high engine speed flag F1 (i.e., set the value of the high engine speed flag F1 to zero) and to set the value of the pulse input flag F2 to 1.

In step S29, the controller 70 is configured to reset a value of a counter. The counter is used to provide a prescribed time interval (offset period) between the close timing of the first variable intake control valve 11 and the close timing of the second variable intake control valve 12.

In step S30, the controller 70 is configured to increment the counter.

In step S31, the controller 70 is configured to determine if the value of the counter has exceeded a reference value S1. If the counter has not exceeded the reference value S1, then the controller 70 ends the routine and returns. If the value of the counter has exceeded the reference value S1, then the controller 70 proceeds to step S32. The reference value S1 is determined in advance experimentally and stored in the ROM of the controller 70. More specifically, the reference value S1 is preferably set to a relatively small amount of time, which is shorter than one fuel injection pulse width. The reference value S1 can be set to a constant value that does not depend on the operating state of the engine 1 or the reference value S1 can be a variable value that changes in accordance with the engine load (e.g., the fuel injection pulse width or the like).

In step S32, the controller 70 is configured to reset the value of the pulse input flag F2 (i.e., set the value of the pulse input flag F2 to 0).

In step S33, the controller 70 is configured to close the second variable intake control valve 12 in addition to the first variable intake control valve 11 so that both of the first and second variable intake control valves 11 and 12 are closed.

FIG. 8 is a timing chart illustrating the variable intake control valve timing when the flowchart shown in FIG. 7 is executed by the controller 70 in accordance with the second embodiment.

Until the engine rotational speed Ne exceeds the prescribed rotational speed B, the control sequence of steps S21→S22→S23→S24 is executed repeatedly and both of the first and second variable intake control valves 11 and 12 are opened.

When the engine rotational speed Ne exceeds the reference rotational speed B, the controller 70 is configured to proceed through the control sequence of steps S23→S25→S26 to close the first variable intake control valve 11 while leaving the second variable intake control valve 12 open.

Then, in the next control cycle, the controller 70 is configured to proceed through the control sequence of steps S21→S22→S27. If an input for the next fuel injection pulse has been received, then the controller 70 is configured to proceed to step S29 to reset the value of the counter. The timing at which the counter is reset is timing $t_1$ shown in FIG. 8.

In the next control cycle, the controller 70 is configured to proceed through steps S21→S30 and to repeat the control sequence of steps S21→S30→S31 until the value of the counter exceeds the reference value S1. When the value of the counter exceeds the reference value S1, the controller 70 is configured to proceed to step S33 to close the second variable intake control valve 12 such that both of the first and second variable intake control valves 11 and 12 are closed. The timing at which the second variable intake control valve 12 is closed is timing $t_2$ shown in FIG. 8.

In the second embodiment, when the engine rotational speed Ne exceeds the prescribed rotational speed B, the first variable intake control valve 11 is closed first and the second variable intake control valve 12 is closed after a prescribed time (the reference value S1 corresponding to a relatively small amount of time) has elapsed. As a result, with the second embodiment too, abrupt consumption of the negative pressure in the negative pressure holding chamber 20b of the vacuum tank 20 can be prevented and the occurrence of air flow noise (a hissing sound) can be suppressed.

By setting the reference value S1 to correspond to a relatively small amount of time, which is shorter than one fuel injection pulse width, control can be executed such that the driver does not feel a step-like change in the engine torque and degradation of the drivability is prevented.

The present invention is not limited to the embodiment described heretofore. Numerous variations and modification can clearly be made without departing from the scope of the technical idea of the invention.

For example, the reference values (i.e., the prescribed rotational speed B, the first and second reference rotational speeds E and F and the first and second reference pulse widths P and Q) mentioned above can be determined as appropriate based on the engine specifications.

Although the first and second embodiments described above use two variable intake control valves (i.e., the first and second variable intake control valves 11 and 12), it is also acceptable to use three or more variable intake control valves.

The first and second embodiments described above use the first and second variable intake control valves 11 and 12 that are normally open (open by default) and exemplify cases in which the valve timings of the first and second variable intake control valves 11 and 12 are controlled to be different from each other when the first and second variable intake control valves 11 and 12 are both operated to be closed from the open state. However, it is also possible to apply the present invention to normally closed variable intake control valves. More specifically, when the normally closed variable intake control valves are used, the negative pressure accumulated in the vacuum tank 20 is used to switch the intake control valves from the closed state to the open state. Therefore, in such case, the controller 70 is preferably configured to control the first and second actuators to offset operating timings of the first and second variable intake control valves so as to suppress the noise in the one-way valve when the first and second variable intake control valves are both switched from the open state to the closed state. In other words, the controller 70 is configured to offset the operation timings by first switching the second variable intake control valve from the closed state to the open state when the engine is operating in one of a prescribed high engine load region and a prescribed high engine rotational speed region (e.g., a region with the engine speed ranging from the prescribed rotational speed B to the prescribed rotational speed C in FIG. 9), and then switching the first variable intake control valve from the closed state to the open state when an engine load falls below the prescribed high engine load region and an engine rotational speed falls below the prescribed high engine rotational speed region (e.g., when the engine speed falls below the prescribed rotational speed B in FIG. 9). Thus, the present invention can also be applied to a system having the normally closed variable intake control valves in order to achieve the effects of suppressing the occurrence of air flow noise (a hissing sound) and preventing the driver from feeling a step-like change in the engine torque when the variable intake control valves are both operated to be opened from the closed state.

Accordingly, with the present invention, the close timings or open timings of the variable intake control valves are controlled to be different from one another when the variable intake control valves are operated to be closed from the open state or operated to be opened from the closed state at the same time in accordance with an increase in engine rotational speed. As a result, the close timings of the variable intake control valves can be offset from one another and the noise emitted from the one-way valve can be reduced.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable air intake control system comprising:
    an intake passage having a first air intake passage portion and a second air intake passage portion to supply air to an engine;
    first and second variable intake control valves arranged between the first and second intake passage portions to selectively open and close communication between the first and second intake passage portions;
    a vacuum tank configured and arranged to store negative pressure;
    first and second actuators operatively coupled between the vacuum tank and the first and second variable intake control valves, respectively, to independently drive each of the first and second variable intake control valves between an open state and a closed state using the negative pressure in the vacuum tank;
    a one-way valve arranged between the vacuum tank and the intake passage to selectively establish communication between the vacuum tank and the intake passage; and
    a controller is configured to control the first and second actuators to offset operating timings of the first and second variable intake control valves so as to suppress the noise in the one-way valve, when the first and second variable intake control valves are switched from a first operating state in which the first and second variable intake control valves are both in one of the open and closed states to a second operating state in which the first and second variable intake control valves are both in one of the open and closed states that is opposite to the first operating state.

2. The variable air intake control system as recited in claim 1, wherein
    the controller is configured to offset the first and second operating timings of the first and second variable intake control valves by switching the first variable intake control valve from the open state to the closed state when the engine is operating in one of a prescribed low engine load region and a prescribed low engine rotational speed region, and switching the second variable intake control valve from the open state to the closed state when an engine load exceeds the prescribed low engine load region and an engine rotational speed exceeds the prescribed low engine rotational speed region, when the first and second variable intake control valves are switched from the first operating state in which the first and second variable intake control valves are both in the open states to the second operating state in which the first and second variable intake control valves are both in the closed states.

3. The variable air intake control system as recited in claim 2, wherein
    the controller is configured to determine the engine load based on a fuel injection pulse width.

4. The variable air intake control system as recited in claim 1, wherein
    the controller is configured to determine an offset period between the first and second operating timings of the first and second variable intake control valves in accordance with an engine rotational speed and a fuel injection pulse width.

5. The variable air intake control system as recited in claim 1, wherein
    the controller is configured to offset the first and second operating timings of the first and second variable intake control valves by switching the second variable intake control valve from the closed state to the open state when the engine is operating in one of a prescribed high engine load region and a prescribed high engine rotational speed region, and switching the first variable intake control valve from the closed state to the open state when an engine load falls below the prescribed high engine load region and an engine rotational speed falls below the prescribed high engine rotational speed region, when the first and second variable intake control valves are switched from the first operating state in which the first and second variable intake control valves are both in the closed states to the second operating state in which the first and second variable intake control valves are both in the open states.

6. The variable air intake control system as recited in claim 5, wherein
    the controller is configured to determine the engine load based on a fuel injection pulse width.

7. The variable air intake control system as recited in claim 1, wherein
    the controller is further configured to set a prescribed offset period between the first and second operating timings of the first and second variable intake control valves.

8. The variable air intake control system as recited in claim 7, wherein
    the controller is further configured to determine the prescribed offset period based on an engine load.

9. The variable air intake control system as recited in claim 7, wherein
    the controller is further configured to adjust the prescribed offset period according to a fuel injection pulse width.

10. The variable air intake control system as recited in claim 7, wherein
    the controller is further configured to set the prescribed offset period to be a period shorter than a fuel injection pulse width.

11. The variable air intake control system as recited in claim 1, wherein
    the first actuator is disposed in a point nearer the vacuum tank than the second actuator to a communicating position between the vacuum tank and the second actuator; and
    the controller is configured to switch the first variable intake control valve from the open state to the closed state before the second variable intake control valve is switched from the open state to the closed state, when the first and second variable intake control valves are switched from the first operating state in which the first and second variable intake control valves are both in the open states to the second operating state in which the first and second variable intake control valves are both in the closed states.

12. A variable air intake control system comprising:
    first and second air flow controlling means for selectively opening and closing communication between first and second intake passage portions of an intake passage of an engine;
    negative pressure accumulating means for accumulating negative pressure;
    air flow regulating means for selectively allowing communication between the negative pressure accumulating means and the intake passage;
    driving means for independently driving each of the first and second air flow controlling means between an open state and a closed state using the negative pressure;
    controlling means for selectively controlling the driving means to offset operating timings of the first and second air flow controlling means so as to suppress the noise in the air-flow regulating means, when the first and second air flow controlling means are switched from a first operating state in which the first and second air flow controlling means are both in one of the open and closed states to a second operating state in which the first and second air flow controlling means are both in one of the open and closed states that is opposite to the first operating state.

13. A variable air intake control method comprising:

accumulating negative pressure in a vacuum tank;

selectively allowing communication between the vacuum tank and an intake passage of an engine;

independently driving first and second variable intake control valves arranged between first and second intake passage portions of the intake passage between an open state and a closed state using the negative pressure to selectively open and close communication between the first and second intake passage portions;

selectively controlling the first and second variable intake control valves to offset operating timings of the first and second variable intake control valves so as to suppress the noise in the one-way valve, when the first and second variable intake control valves are switched from a first operating state in which the first and second variable intake control valves are both in one of the open and closed states to a second operating state in which the first and second variable intake control valves are both in one of the open and closed states that is opposite to the first operating state.

* * * * *